July 3, 1934.  T. ZUSCHLAG  1,964,776
ROTATING TUBE INDICATING DEVICE
Filed Aug. 6, 1932
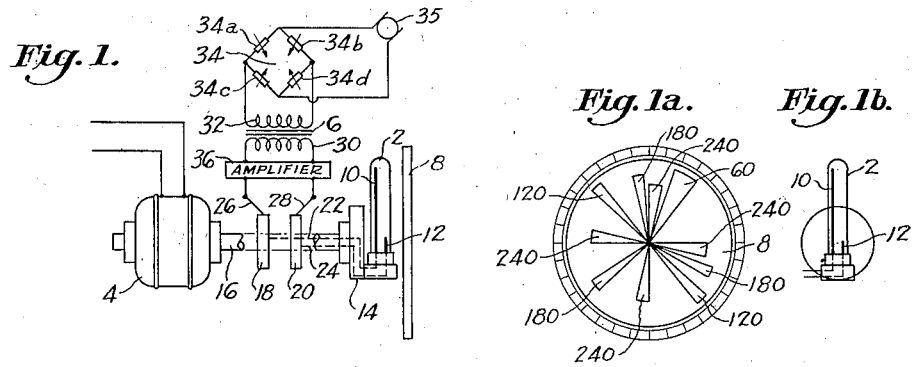
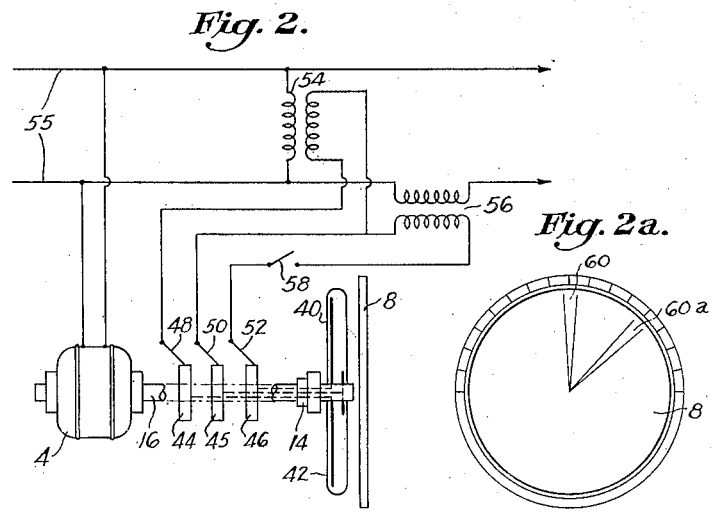
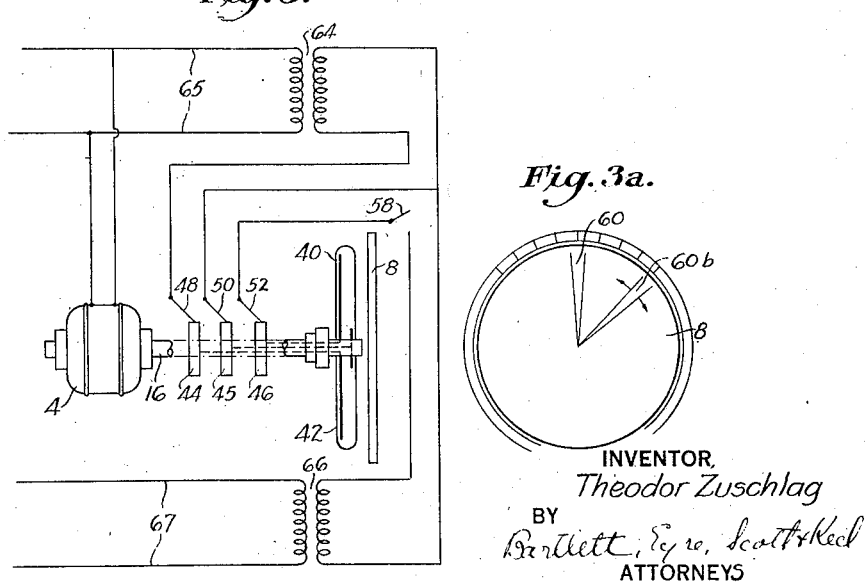
INVENTOR,
Theodor Zuschlag
BY
Bartlett, Eyre, Scott & Keel
ATTORNEYS Patented July 3, 1934

1,964,776

UNITED STATES PATENT OFFICE 1,964,776

ROTATING TUBE INDICATING DEVICE

Theodor Zuschlag, West Englewood, N. J., assignor to Magnetic Analysis Corporation, Long Island City, N. Y., a corporation of New York Application August 6, 1932, Serial No. 627,748

4 Claims. (Cl. 172—245)

The present invention relates to novel apparatus for visually indicating the characteristics of electric phenomena and particularly alternating voltage and current.

Alternating current is used extensively in various types of test and measuring devices wherein it is desirable or useful to obtain a visual representation of the current wave. Moving coil oscillographs have heretofore been used for this purpose. Being relatively delicate and complicated instruments, they are not well suited for other than laboratory work and they require particularly careful handling by skilled operators.

One object of the present invention is to produce visual representations which will allow interpretations to be made as to the characteristics of a current or voltage wave by utilizing a rotating glow tube where a moving coil oscillograph would previously have been used. Another object is to produce an apparatus equally adapted for use in the field or in the laboratory. A still further object is to simplify the apparatus so that skilled operators are not required.

These and other objects will be readily understood from the following description and the accompanying diagrammatic drawing, of which:

Fig. 1 illustrates an indicating device constructed according to the invention and associated with a Wheatstone bridge network to indicate the condition thereof;

Fig. 1a shows the visual representations obtained by the apparatus of Fig. 1;

Fig. 1b is a detail view of the tube of Fig. 1;

Fig. 2 illustrates an indicating device embodying the invention and including two rotating tubes, the device being shown as arranged for determining the power factor of the line current;

Fig. 2a shows the visual representations obtained with the apparatus of Fig. 2; and Figs. 3 and 3a illustrate respectively the use of a two tube indicating device as a synchronizer, and the visual representations obtained therewith.

As illustrated the apparatus comprises in general a glow tube 2, a driving motor 4, a suitable input transformer 6 and a projection screen 8. Tube 2 is filled with a suitable conducting gas, such as neon, and provided with electrodes 10 and 12, between which when a sufficient voltage is impressed thereon, current will be passed accompanied by a glow along one or the other of the electrodes according to the direction of the current through the tube. Tube 2 is rotated by driving motor 4, being secured to flange 14 which is fixed to drive shaft 16 of motor 4. The tube is located on the flange so that the bases of the electrodes are in close proximity to the axial center thereof. A pair of collector rings 18 and 20 are also fixed to and rotate with drive shaft 16, and are connected to the electrodes 10 and 12 through suitable wiring 22 and 24. The collector rings are connected to the secondary 30 of the input transformer 6 through brushes 26 and 28.

In the particular arrangement illustrated, the rotating tube is connected for indicating the condition of balance of a Wheatstone bridge network 34 and, for this purpose the primary 32 of transformer 6 is shown connected to opposite terminals of the bridge; the bridge being supplied with alternating current from any suitable source, indicated at 35, connected across the other pair of terminals of the network. The arms of the bridge are diagrammatically indicated as comprising variable impedance elements 34a, 34b, 34c and 34d. If desired an amplifier 36 may be connected into the circuit for increasing the intensity of the current delivered to the tube.

Screen 8 is made of any suitable transparent material and is placed in proximity to the rotating tube with its center in axial alinement with the center of rotation; screen 8 being preferably graduated in any suitable manner as indicated.

In operation, if the bridge network is not in balance, an alternating potential will be impressed across the electrodes 10 and 12 of the tube. During one-half cycle of the alternating wave electrode 10 will be positive, with respect to electrode 12 and during the other half cycle the polarity of the impressed voltage will be in the opposite direction. During that part of each half cycle when the magnitude of the impressed voltage is sufficient to cause current to be passed by the tube, a glow will appear along whichever electrode is negative with respect to the other; the length of glow along the respective electrode depending upon the intensity of the current and its duration depending upon the relation between the minimum voltage required to pass current and the maximum or peak value of the wave. Due to the shortness of electrode 12, the glow appearing during any portion of the half cycle when that electrode is at a lower potential than electrode 10 will be of such a short length as to appear only as a spot of light adjacent the center of rotation of the tube. During the other half cycle, assuming the tube to be rotated in synchronism with the fundamental frequency of the impressed voltage, a glow of considerable extent will appear along electrode 10 when the impressed voltage approaches the peak voltage, which glow, appearing once each revolution, will, due to the persistence of vision, appear as a fixed radial glow upon screen 8. In Fig. 1a this glow, corresponding with the fundamental frequency, is indicated diagrammatically at 60. If the voltage wave is a complex wave, as would be the case when the tube is connected as in Fig. 1, across the secondary of an iron cored transformer, then two oppositely disposed glows, indicated by the reference numeral 120 and corresponding to the second harmonic of the impressed voltage, will be observed upon screen 8. Similarly, glows of lesser extent and of correspondingly greater number of occurrences for each revolution of the tube will occur for each harmonic of the impressed voltage. In Fig. 1a glows corresponding to the third harmonic are indicated by the reference numeral 180 and those corresponding to the fourth harmonic are indicated by the reference numeral 240.

The rotating tube thus gives upon the screen a complete analysis of a composite wave, indicating not only the presence or absence of harmonics but also their relative magnitudes. Thus when the tube is used as in Fig. 1, in connection with a network including variable impedances, balance of the bridge may be effected not only for the fundamental frequency but also for one or more of the harmonics. A change of phase in the excitation voltage will be immediately made apparent by a rotational shift in the ray picture.

An application of the invention to the determination of the power factor of a line is illustrated in Figs. 2 and 2a. In Fig. 2 a pair of glow tubes 40 and 42 each of similar construction to glow tube 2 are arranged diametrically opposite on the rotatable flange 14. Three collector rings 44, 45 and 46 are carried by shaft 16, collector rings 44 and 45 connecting through suitable wiring to tube 42 and rings 45 and 46 connecting to tube 40. Collector rings 44 and 45 connect through brushes 48 and 50 to the secondary of voltage transformer 54 connected across the line 55, the power factor of which is to be determined, and rings 45 and 46 connnect through brushes 50 and 52 to the secondary of a current transformer 56. It will be noted that the short electrodes of the tubes 40 and 42 are connected to the common collector ring 45, and through brush 50 to opposite interconnected terminals of the transformers, the tubes 42 and 40 thereby being connected in series with transformers 54 and 56 respectively but with opposite phase. A switch 58 permits the cutting out of tube 40.

In operation if motor 4 is connected across the line 55, tube 42 will rotate in synchronism with the frequency of the excitation voltage and the single glow 60 will appear on the screen (assuming no harmonics are present). By suitable electrical or mechanical means (not shown) the glow may be made to coincide with a zero point on screen 8. Switch 58 is then closed, whereupon a second glow 60a will appear on screen 8. With the screen properly graduated, the angular difference between the glows 60 and 60a will be a direct indication of the power factor.

Another application of the invention is shown in Figs. 3 and 3a wherein two rotating tubes are used to indicate when a pair of power lines are in synchronism. Collector rings 44 and 45 are connected through brushes 48 and 50 to the secondary of voltage transformer 64, the primary of which is connected across the power line 65, and rings 45 and 46 are interconnected through brushes 50 and 52 and switch 58 to the secondary of voltage transformer 66; the primary of which is connect- ed across the power line 67; the tubes in this instance being connected in the same phase.

In operation motor 4 being connected across the main line, tube 42 will rotate in synchronism with the excitation voltage thereof and produce the glow 60 on screen 8, which may be shifted to a desired position. Switch 58 is then closed to impress the voltage of line 67 across tube 40. A second glow 60b then appears which will rotate to the right or left, dependent upon the frequency relation of the two lines. When the glows 60 and 60b coincide the lines are in synchronism and may be interconnected. It is apparent that by suitable modification a three phase system could likewise be brought into synchronism.

Two embodiments of the indicating device have now been described and two applications of the embodiment comprising two rotating tubes, have been indicated. Obviously many other applications of use of the device are possible and various changes in the construction of the tube and of the apparatus associated therewith could be made without departing from the spirit of the invention. Preferably the tube, or each tube, when more than one is used for a single indicating device, is constructed as illustrated with one electrode substantially longer than the other and the tube rotated about an axis substantially coinciding with the end of the shorter electrode, because this permits of a simpler construction and because the resulting wave picture even when a composite wave is impressed across the electrodes, is relatively simple. In some instances, however, it may be advisable to use in the tube, electrodes of equal length, in which case such electrodes are introduced from opposite ends of the tube and the tube is rotated about an axis substantially midway between the ends of the electrodes.

The following is claimed:

1. An indicating device for analyzing alternating current phenomena, comprising in combination a tube containing an inert gas, a pair of parallel electrodes therein, means for impressing an alternating potential difference across said electrodes, means for rotating said tube about an axis passing through said tube at right angles to said electrodes and means in the path of the light emitted by said tube when current passes therethrough upon which, by persistence of vision, a stationary ray picture appears when the tube is rotated at the frequency of the alternating potential difference impressed across the electrodes, the ray picture including radially disposed glows corresponding to peak voltages of harmonics of the impressed alternating potential difference.

2. An indicating device according to claim 1 wherein one of said electrodes is substantially longer than the other and both electrodes extend into said tube from one end thereof, and wherein the axis of rotation passes through said tube substantially at the free end of the shorter one of said electrodes.

3. An indicating device for analyzing alternating current phenomena comprising in combination two tubes each containing a pair of electrodes and an inert gas, a shaft rotatable about its longitudinal axis, two sources of alternating potential difference, means for impressing the alternating potential difference of one of said sources across the electrodes of one of said tubes and the alternating potential difference of the other of said sources across the electrodes of the other of said tubes, said tubes being symmetrically mounted on said shaft for rotation thereby with their electrodes radially disposed with respect to the axis of the shaft, and a transparent screen in a plane perpendicular to the axis of rotation of said shaft and positioned adjacent said tubes whereby, when said shaft is rotated synchronously with one of said sources a stationary radial glow appears upon said screen corresponding to peak voltage of the source with which the rotation of said shaft is synchronized and a second radial glow appears upon said screen corresponding to peak voltage of the other source, which glow, if said sources have identical frequencies, will appear stationary at an angular displacement from said first glow corresponding to the difference in phase of said sources and if said sources are not at the same frequency will appear to rotate about the axis of rotation of said shaft.

4. An indicating device according to claim 1 wherein said means for impressing an alternating potential difference across said electrodes include a transformer and an amplifier, the primary of said transformer being connected across the alternating potential difference to be indicated and the secondary of said transformer being connected through said amplifier to the said electrodes.

THEODOR ZUSCHLAG.